United States Patent [19]

Iwamoto et al.

[11] Patent Number: 4,911,522
[45] Date of Patent: Mar. 27, 1990

[54] CORE ALIGNMENT SYSTEM FOR OPTICAL FIBERS

[75] Inventors: Yoshinao Iwamoto, Saitama; Yuichi Shirasaki, Tokyo; Masayuki Fujise, Kanagawa; Kenichi Asakawa, Tokyo, all of Japan

[73] Assignee: Duo-Fast Corporation, Franklin Park, Ill.

[21] Appl. No.: 596,486

[22] Filed: Apr. 3, 1984

[30] Foreign Application Priority Data

Apr. 8, 1983 [JP] Japan .................................. 58-60860

[51] Int. Cl.$^4$ .............................................. G02B 6/38
[52] U.S. Cl. .................................................. 350/96.21
[58] Field of Search ................. 350/96.15, 96.20, 96.21

[56] References Cited

U.S. PATENT DOCUMENTS

| | | | |
|---|---|---|---|
| 3,982,123 | 9/1976 | Goell et al. | 350/96.20 |
| 4,119,363 | 10/1978 | Camlibel et al. | 357/17 |
| 4,131,911 | 12/1978 | Fujine et al. | 357/74 |
| 4,452,506 | 6/1984 | Reeve et al. | 350/96.15 |
| 4,474,423 | 10/1984 | Bisbee et al. | 350/96.15 |
| 4,474,469 | 10/1984 | Abe | 350/96.21 |

FOREIGN PATENT DOCUMENTS

| | | |
|---|---|---|
| 0021091 | 1/1981 | . |
| 0030108 | 6/1981 | . |
| 1500026 | 2/1978 | United Kingdom . |
| 2118322 | 10/1983 | United Kingdom . |

OTHER PUBLICATIONS

Electronics Letters, Aug. 5, 1982, "Novel Core Alignment Method For Low-Loss Splicing of Single-Mode Fibers Utilising UV-Excited Fluorescence of Ge--Doped Silica Core", vol. 18, No. 16, pp. 712-713.

Primary Examiner—William L. Sikes
Assistant Examiner—Robert E. Wise
Attorney, Agent, or Firm—Mason, Kolehmainen, Rathburn & Wyss

[57] ABSTRACT

A core alignment system for aligning a pair of optical fibers to be spliced, in which core alignment is accomplished by applying a pair of aligned beams of light emitted in opposite directions by a semiconductor laser to the butt joint ends of a pair of optical fibers to be spliced, detecting a leakage beam leaking from a side surface of each optical fiber close to the laser, and adjusting the positioning of the optical fibers so that the leakage beams are minimized.

3 Claims, 8 Drawing Sheets

ANGLE $\theta$ (DEGREE)

CORE ALIGNMENT SYSTEM FOR OPTICAL FIBERS

BACKGROUND OF THE INVENTION

The present invention relates to a process for accurate alignment of an axis of an optical communication fiber.

An axis alignment of an optical fiber requires an accurate axis alignment in splicing with small loss, in particular, in the case of a single mode optical fiber. A prior axis alignment which is called a power monitor method is shown in FIG. 1, in which the numeral 1 is a light source, 2 and 4 are optical fibers to be spliced, 3 is a splicer, 5 is a detector, and 5a is a meter for indicating the output level of the detector 5. In FIG. 1, the light generated by the light source 1 passes the whole length of the optical fibers 2 and 4, and the splicer 3 adjusts the relative position of the optical fibers 2 and 4 finely so that the maximum optical power is applied to the optical fiber 4. The reception of the optical power in the fiber 4 is accomplished by the detector 5 which is located at the far end of the fiber 4. Therefore, the information obtained by the detector 5 must be returned to the splicer 3 for the fine adjustment of the splicing and therefore, the splicing operation is complicated.

Further, the system of FIG. 1 cannot be used in splicing optical fibers for a digital regenerative transmission system, since the amplitude information of a light signal is lost in a repeater, which regenerates input thereto signal.

Further, when a test signal cannot be applied to one of the ends of the optical fiber, the method of FIG. 1 can not be used.

SUMMARY OF THE INVENTION

It is an object, therefore, of the present invention to overcome the disadvantages and limitations of a prior axis alignment system for optical fibers by providing a new and improved alignment system.

It is also an object of the present invention to provide an axis alignment system which accomplishes the alignment without passing a light through the entire length of the fibers, and is also applicable to a digital regenerative transmission system.

The above and other objects are attained by a core alignment system comprising the steps of positioning a laser source which provides a pair of aligned beams in opposite directions between a pair of butt ends of optical fibers to be spliced, illuminating said butt ends with beams of said laser source, sensing leakage beams through side wall of the optical fibers close to said butt ends, adjusting finely at least one of the optical fibers so that sensed signal becomes minimum, removing said laser source, said sliding at least one of said butt ends linearly so that spacing between said butt ends is in a desired range.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The following embodiments are described for the use of a semi-conductor laser.

Figure 1:
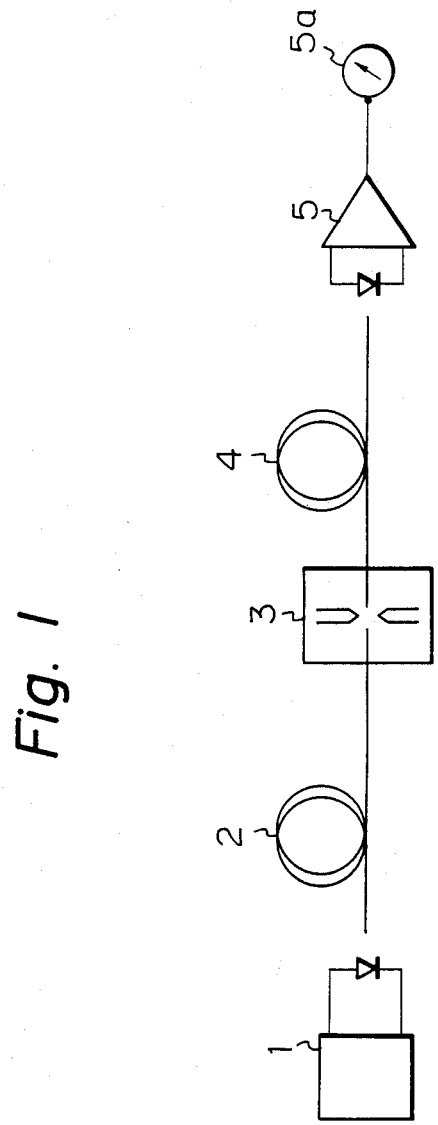
FIG. 1 is a prior monitor system.
Figure 2:
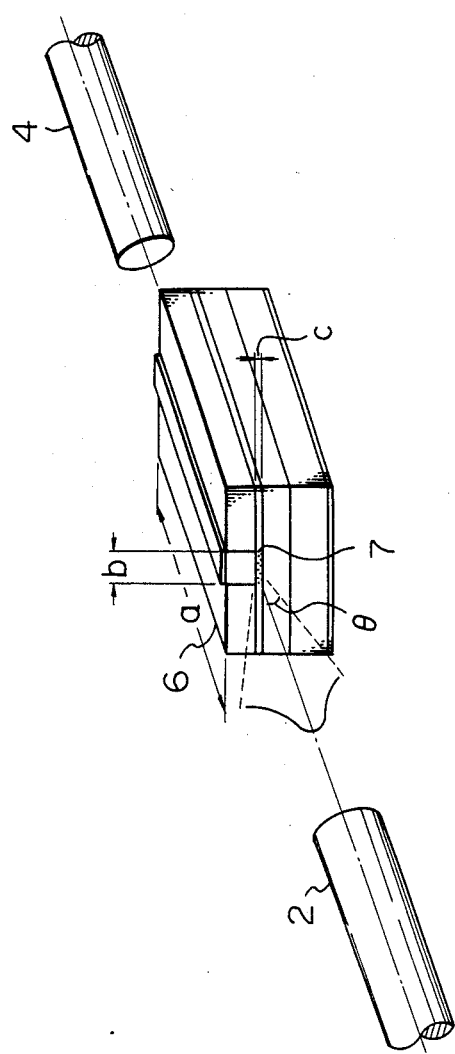
FIG. 2 shows a structure of a semi-conductor laser located between a pair of optical fibers to be spliced.
Figure 3A:
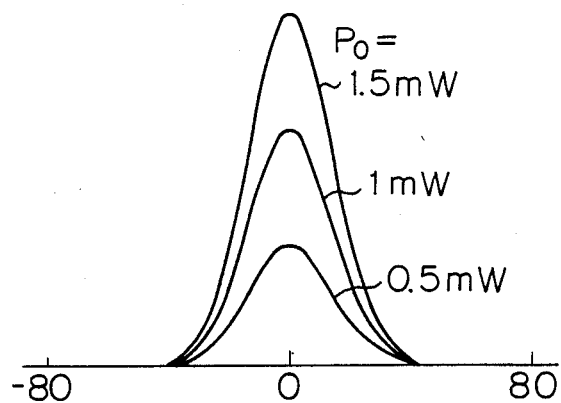
FIGS. 3A and 3B show a far field pattern of optical power of semi-conductor lasers.
Figure 3B:
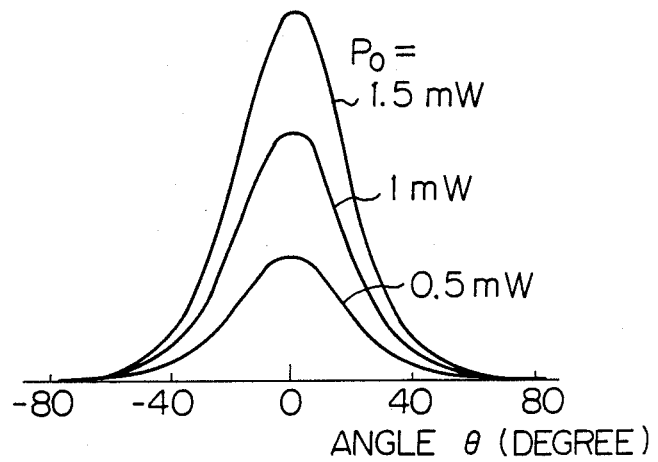

FIG. 2 shows a structure of a semi-conductor laser, and FIGS. 3A and 3B show a far field pattern of a semiconductor laser. In FIG. 2, the numeral 6 is a semiconductor laser, and 7 is an active region. The length (a) of the semiconductor laser 6 is 200–300 $\mu$m, the width (b) of the active region 7 is 1–10 $\mu$m, and the thickness (c) of the active region 7 is 0.2–0.3 $\mu$m. The angle $\theta$ shows the angle between the center axis of the output beam and the dotted line.

FIGS. 3A and 3B show the far field pattern curves which show the relationship between said angle ($\theta$) degree and the output power $P_0$ (milliwatts), and FIG. 3A shows the case that the far field pattern in the plane parallel to the junction plane, and FIG. 3B shows the case that the far field pattern in the plane perpendicular to the junction plane. It should be noted in FIGS. 3A and 3B that the output beam of a semiconductor laser has sharp directivity. According to the present invention, a pair of optical fibers 2 and 4 are located close to the mirror planes of the semiconductor laser 6 so that the beam axis of the laser beam coincides with the axis of the optical fibers, then, the axis alignment is accomplished by monitoring the beam power which inputs into the optical fibers.

Figure 4:
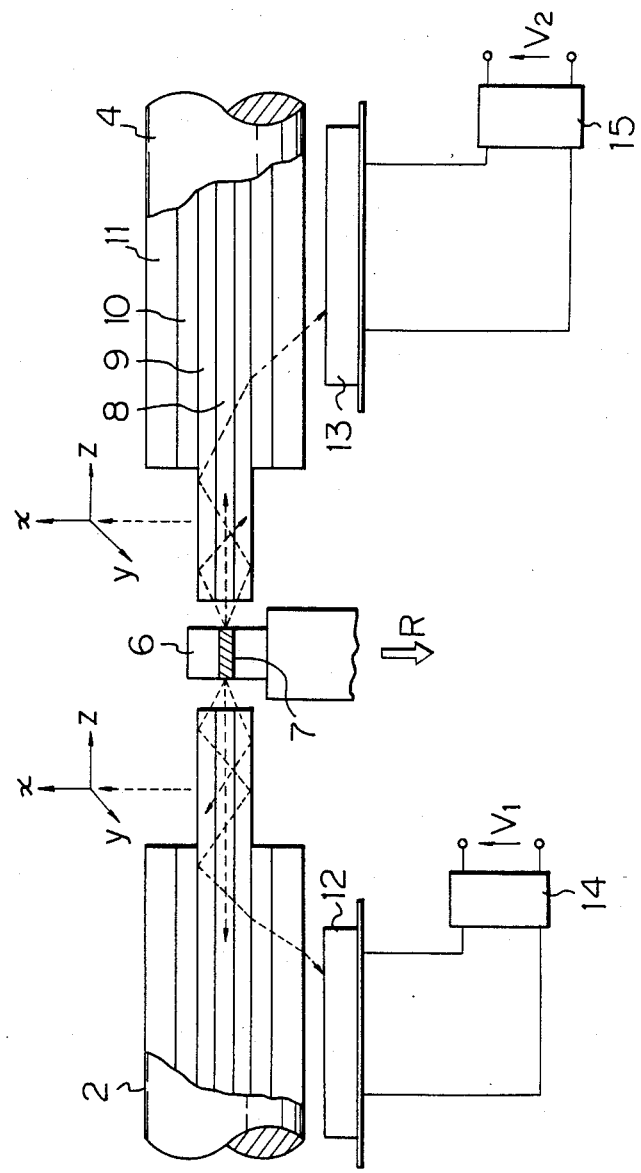
FIG. 4 shows a structure of the present axis alignment system.

FIG. 4 shows the embodiment of the present invention, in which the numeral 8 is a core of the optical fibers to be spliced, 9 is a cladding of the optical fibers to be spliced, 10 is a buffer layer of the optical fibers to be spliced, 11 is a protection layer of the optical fibers to be spliced, 12 and 13 are photo detectors, and, 14 and 15 are amplifiers. The semiconductor laser 6 is positioned between the optical fibers 2 and 4 to be spliced so that the direction of the output beams of the semiconductor laser 6 coincides with the direction of the axes of the optical fibers 2 and 4. The input beam applied to the fibers from the mirror planes of the semiconductor laser is separated to a waveguide mode which propagates in a core 8 and a cladding mode which propagate in a cladding 9.

When the buffer layer 10 and protection layer 11 are removed, the cladding mode propagates in the cladding 9 without leakage in an air space, since the refractive index $n_2$ of a cladding is higher than the refractive index $n_1$ of an air space.

On the other hand, at the portion where the buffer layer 10 covers the cladding and the core, the optical beam in the cladding 9 propagates in the buffer layer 10 and leaks into the air space through the side wall of the optical fiber, due to nonuniformity of the cladding, buffer layer and/or the protection layer, since the refractive index $n_3$ of the buffer layer 10 is larger than the refractive index $n_2$ of the cladding.

That leakage beam is sensed by the detectors 12 and 13, and then, amplified by the amplifiers 14 and 15.

Figure 5:
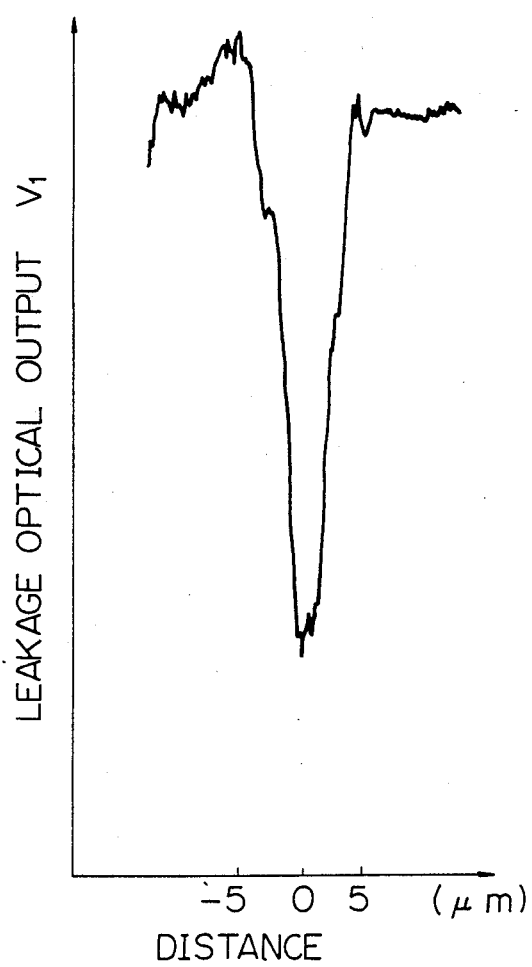
FIG. 5 shows curves of a leakage power of a cladding mode.

FIG. 5 shows the experimental curve of the relationship between the leakage beam detection signal $V_1$ and the error ($\mu$m) of the center of the beam and the core axis of an optical fiber, which is a single mode optical fiber with the core diameter about 8 $\mu$m. It should be noted in FIG. 5 that almost all the power applied into the optical fiber propagates in the core 8 as the waveguide mode when the beam center of the output beam of the semiconductor laser 6 coincides with the core axis of the optical fiber, and then, the leakage beam of the cladding mode is minimum. Further, it should be appreciated that the direction of the output beams of a semiconductor laser from a pair of opposite mirror planes coincides completely with each other, therefore, the axis alignment of the optical fibers is accomplished by positioning the optical fibers by finely adjusting the location in the x- and y- directions so that the detected signal levels $V_1$ and $V_2$ become minimum. When the core axes alignment is completed, the semiconductor laser 6 in FIG. 4 is removed in the direction R, then, at least one of the optical fibers 2 and 4 is slid in the z-direction which coincides with the core axis direction so that the spacing beteen two optical fibers is appropriate for melting splicing (for instance 10 $\mu$m). Then, the conventional melting splicing is accomplished by applying an arc to the butt joints.

The semiconductor laser 6 in the present invention may be either a short wavelength laser or a long wavelength laser. Further, a super luminescence type light emission diode which provides output beams in a pair of opposite directions can be used in the present invention, instead of a semiconductor laser. Further, the combination of a laser of a single output beam and a dual direction reflection mirror is available in the present invention, instead of a semiconductor laser.

Figure 6:
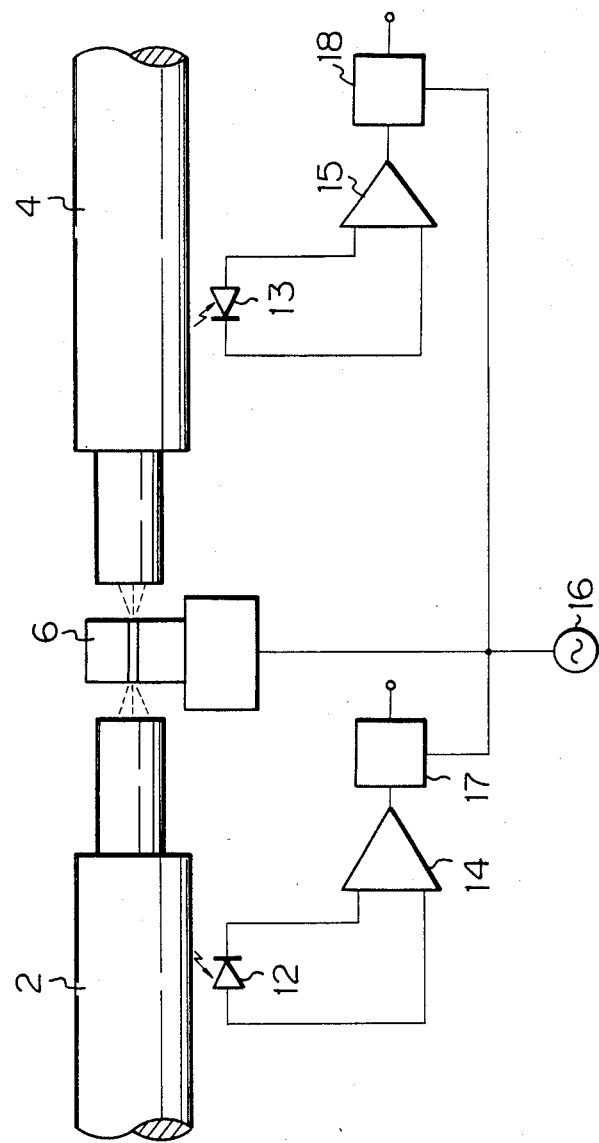
FIG. 6 shows a structure of another embodiment of the present axis alignment system.

FIG. 6 shows another embodiment of the present invention, in which the numerals 14 and 15 are amplifiers, 16 is a modulation signal generator for the semiconductor laser 6, and 17 and 18 are synchronization detectors. In the embodiment of FIG. 6, the beam applied to the optical fibers is modulated by the modulation signal from the generator 16, and the leakage beam in the side wall of the optical fibers is sensed by the detectors 12 and 13, then, the leakage signals are detected through the synchronization detectors 17 and 18 which take a reference signal of the output of the modulation signal generator. Due to the use of the synchronization detection, the sensitivity of the detection of the leakage beam in FIG. 6 is improved.

Figure 7:
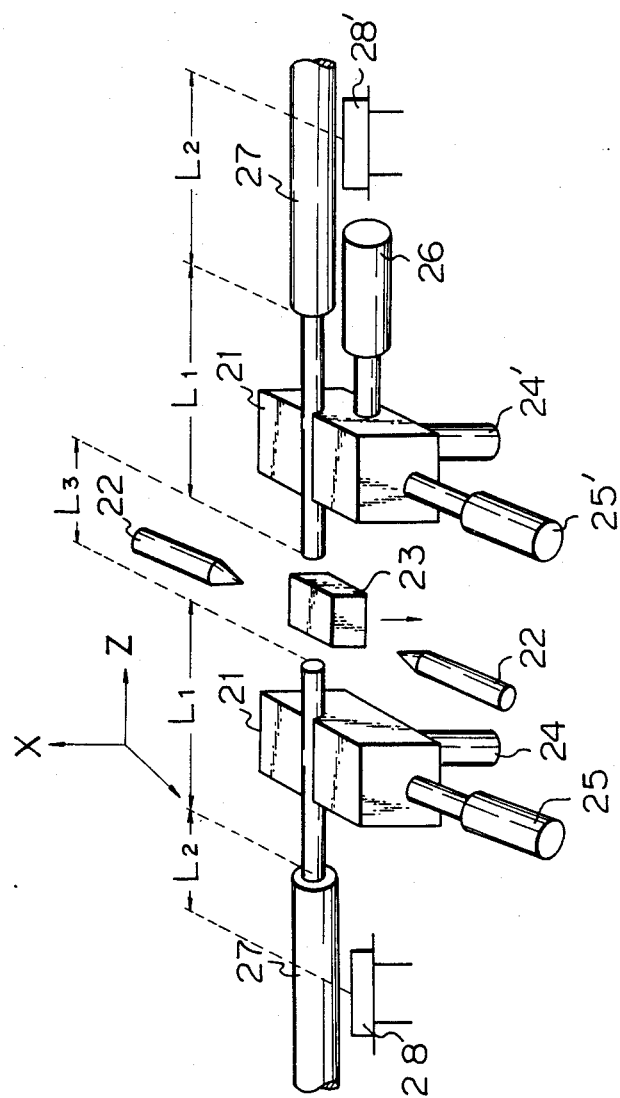
FIG. 7 shows the structure of the present core alignment device.

FIG. 7 shows the structure of the present optical fiber splicing device, in which the numeral 21 designates a V-shaped groove support, 22 is an electrode of an arc fusion splicer (not shown), 23 is a laser source, 24 is a linear positioner (X-direction), 25 is a linear positioner (Y-direction), 26 is a linear positioner (Z-direction), 27 is an optical fiber to be spliced, and 28 is a photo detector for sensing leakage beam on side wall of the optical fiber 27. The electrical output of the photo detector 28 is applied to an amplifier (not shown).

In the preferred embodiment, the length $L_1$ that the buffer layer and the protection layer are removed is about 15 mm, the length $L_2$ between the photo-detector 28 and the end of the buffer layer (and the protection layer) is 10-15 cm, and the length $L_3$ between butt ends of the optical fibers to be spliced is 300 $\mu$m. the photo-detector 28 is for instance a type J16P produced by Judson Inc. in the USA.

In operation, a pair of optical fibers to be spliced are positioned in the V-grooves 21 so that the spacing $L_3$ is about 300 $\mu$m, and the light source 23 is positioned in that spacing between the butt ends. In illuminating the butt ends with the light source 23, one of the optical fibers 27 is slid by operating the positioners 24 and 25 so that the output level of the detector 28 becomes minimum. Then, the positioner 24' and the positioner 25' are adjusted so that the output level of the detector 28' becomes minimum. Then, the laser source 23 is removed. Next, one of the optical fibers 27 is slid linearly in the Z-direction by operating the linear positioner 26 so that the spacing between the butt ends is in the desired range for splicing (that spacing is for instance 10 $\mu$m). Finally, the splicing is effected by providing an arc between the electrodes 22.

Figure 8:
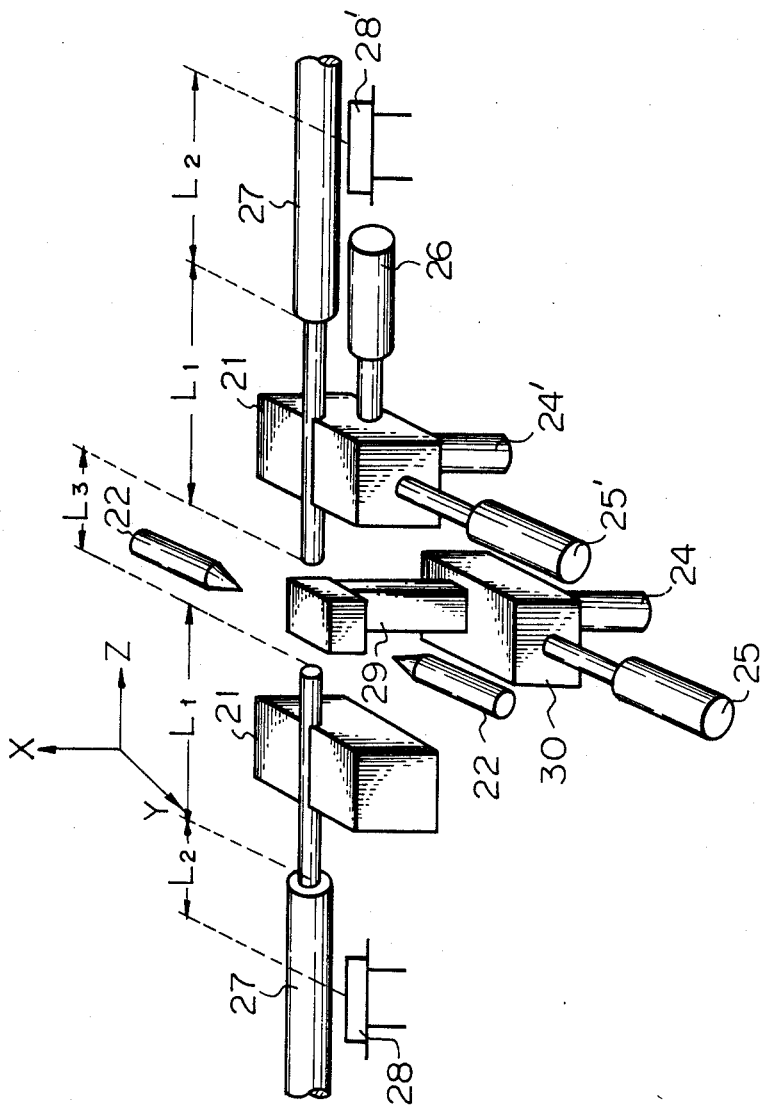
FIG. 8 is another structure of the present core alignment system.

FIG. 8 is the modification of the embodiment of FIG. 7. In FIG. 8, the numeral 29 is a support for supporting the semiconductor laser 23, and it should be noted that said support 29 is adjustable by linear positioners. The alignment of the core of the fixed optical fiber 27 and the output beam of the laser 23 is accomplished by adjusting the linear positioners 24 and 25 so that the output level of the detector 28 becomes minimum. Then, the other optical fiber 27' is adjustted by the linear positioners 24' and 25' so that the leakage level becomes minimum. Then, the semiconductor laser 23 together with the support 29 are removed, and one of the optical fibers (right one in FIG. 8) is moved in the Z-direction by adjusting the linear positioner 26 so that the spacing between the abutted ends is appropriate for arc fusion. Finally, the abutted ends are spliced by conventional arc fusion.

As described above in detail, according to the present invention, the axis alignment is accomplished without passing a test beam through the entire length of the fibers, therefore, the operation of the splicing of the optical fibers is considerably simplified. Further, the present invention is applicable to a digital communication system which uses a regenerative repeater to which a prior power monitor system cannot be applied.

From the foregoing, it will now be apparent that a new and improved axis alignment system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A process for aligning the cores of a pair of optical fibers to be spliced and each having an inner core, a cladding surrounding said core and having a higher refractive index than air, a buffer layer surrounding said cladding and having a higher refractive index than said cladding, and a protection layer surrounding said buffer layer, comprising the steps of:

removing said protection layer and said buffer layer over a predetermined distance from opposed spaced butt ends of each of a pair of optical fibers to be spliced;

positioning a light source, emitting a pair of aligned beams in opposite directions, between said opposed spaced butt end of said pair of optical fibers to be spliced;

illuminating said butt ends with respective beams of said light source;

sensing leakage beams from each optical fiber at a point close to each of said butt ends and radially spaced apart form each optical fiber such that said leakage beam is propagated through said cladding and into said buffer layer of each of said pair of optical fibers and is sensed after passing through side walls of the pair of optical fiberes and the air;

adjusting the position of at least one of said pair of optical fibers so that the sensed leakage beam signal therefrom becomes minimized;

removing said laser source from between said butt ends; and sliding at least one of said butt ends linearly in an axial direction of the optical fiber so that a spacing between said butt ends is in a desired range for splicing thereof.

2. A core alignment system for optical fibers, comprising:

a light beam source for emitting a pair of aligned output beams in opposite directions, and positionable between butt ends of optical fibers to be spliced;

a pair of photo-detectors each positioned for facing a respective side wall of one of a pair of optical fibers to be aligned in spaced relation thereto and close to said laser beam source, for detecting leakage beams emitted through said side walls;

a pair of amplifiers each arranged for amplifying respective output signals of said photo-detectors corresponding to detected leakage beams; and means for adjusting the position of at least one of a pair of optical fibers to be aligned;

whereby core alignment may be accomplished by positioning at least one of the pair of optical fibers so that the respective output signals of said amplifiers become minimized.

3. A core alignment system according to claim 2, wherein a synchronization detection means together with a modulation signal generator are provided in operable connection with said light beam source and said amplifiers whereby light beams emitted by said light beam source are modulated by an output signal of said modulation signal generator, and said output signals of said amplifiers are synchronization detected with reference to said output signal of said modulation signal generator.

* * * * *

UNITED STATES PATENT AND TRADEMARK OFFICE
CERTIFICATE OF CORRECTION

PATENT NO. : 4,911,522

DATED : March 27, 1990

INVENTOR(S) : IWAMOTO et al

It is certified that error appears in the above-identified patent and that said Letters Patent is hereby corrected as shown below:

On the cover page, Item [73], "Duo-Fast Corporation, Franklin Park, Ill." should read --Kokusai Denshin Denwa Co., Ltd., Tokyo, Japan--;

Above Item [57], "Mason, Kolehmainen, Rathburn & Wyss" should read --Armstrong, Nikaido, Marmelstein, Kubovcik & Murray--.

Signed and Sealed this

Fourth Day of June, 1991

*Attest:*

HARRY F. MANBECK, JR.

*Attesting Officer*  *Commissioner of Patents and Trademarks*